United States Patent [19]

Muzumdar et al.

[11] 4,394,757
[45] Jul. 19, 1983

[54] FRAME FORMAT FOR PCM SPEECH DATA IN A TELEPHONE TRANSMISSION SYSTEM AND DIGITAL TELEPHONE APPARATUS FOR USE WITH THIS FRAME FORMAT

[75] Inventors: Deepak Muzumdar, Somerset, N.J.; George A. Mierzwa, Boca Raton, Fla.; Richard Sanders, Boca Raton, Fla.; Orrie J. Van der Meiden, Boca Raton, Fla.

[73] Assignee: Siemens Corporation, Iselin, N.J.

[21] Appl. No.: 249,395

[22] Filed: Mar. 31, 1981

[51] Int. Cl.³ .............................. H04J 3/06; H04J 3/12
[52] U.S. Cl. .................................. 370/100; 370/110.1; 179/2 DP
[58] Field of Search ...................... 370/100, 110.1, 99, 370/24; 179/2 DP

[56] References Cited

U.S. PATENT DOCUMENTS 3,207,851  9/1965  Fukinuki ............................... 370/99
3,937,882  2/1976  Bingham ............................... 370/24

FOREIGN PATENT DOCUMENTS 2619333  11/1977  Fed. Rep. of Germany.
2621603  11/1977  Fed. Rep. of Germany.

OTHER PUBLICATIONS

"Fernsprechendgerate in Digitaler Technik" NTZ, vol. 33 (1980), No. 12, by Peter Hirschmann.

Primary Examiner—Douglas W. Olms
Attorney, Agent, or Firm—Karl F. Milde, Jr.

[57] ABSTRACT

A frame format for PCM speech data in a telphone transmission system and a digital telephone apparatus for use with this frame format are disclosed. The frame format includes a superframe formed of 32 data frames, each comprising three 8 bit data words (bytes). The first data word of a frame includes a synchronization code and a signalling code; the second and third data words include PCM speech samples or other digital data. A transmission rate of 192 kilobits/second is chosen so as to match the PCM sampling rate of 8 KHz.

5 Claims, 9 Drawing Figures

FRAME FORMAT FOR PCM SPEECH DATA IN A TELEPHONE TRANSMISSION SYSTEM AND DIGITAL TELEPHONE APPARATUS FOR USE WITH THIS FRAME FORMAT

CROSS-REFERENCE TO RELATED APPLICATIONS

This application is related to the following commonly-owned U.S. patent applications:
(1) U.S. patent application Ser. No. 249,377 of Donald Gray and Theodore Wagner for "A Transceiver Unit for Use with a Telecommunication System";
(2) U.S. patent application Ser. No. 249,399 of Theodore Wagner, Remesh M. Vyas and Samuel Liang for "Synchronizing Circuit for Use with a Telecommunication System";
(3) U.S. patent application Ser. No. 249,400 of Theodore Wagner, Sam Liang, Deepak R. Muzumdar for "Digital Telephone Apparatus"; and
(4) U.S. patent application Ser. No. 249,390 of Mustafa Y. M. Saleh for "DC/DC Converter".

BACKGROUND OF THE INVENTION

The present invention relates to a frame format for PCM speech data in a telephone transmission system, and to a digital telephone apparatus for use with this frame format. More particularly, the invention relates to a digital telephone transmission system which utilizes a standard, four-wire, telephone transmission line and operates in the full duplex mode for communication between subscriber stations, attendant consoles and data recording, storage and processing equipment.

As is well known, the conventional telephone apparatus is an entirely "analog" device and comprises an acoustic/electrical transducer or microphone, an electrical/acoustic transducer or earphone, a hook switch, a dialing mechanism and a bell or buzzer. As the cost of electronic equipment is currently falling, many "features" may be added to this otherwise remarkable invention.

Some typical features which a telephone instrument may include are:
(1) a plurality of "line" keys which, when depressed, connect the telephone to different lines;
(2) a plurality of "function" keys which, when depressed, initiate one or more of a number of telephone functions;
(3) a display which images a number of alphanumeric characters;
(4) a microphone for "hands free" speaking;
(5) a speaker for "hands free" listening;
(6) an external unit jack for connecting the telephone to a recording printer, a digital data interface unit, a magnetic recorder for taking messages, a console containing additional line and function keys and/or another peripheral unit such as an external computer, CRT display and the like; and
(7) a small computer which may be utilized by the customer as a programmable element as well as to control the instrument.

As these and other features and functions are added to the telephone instrument, it can become a most convenient and versatile piece of equipment. Not only will the telephone in the future serve each user as an instrument of voice and data communications, it will also serve other telecommunication functions such as providing music, external paging, message recording and/or dictation access; room and building security against unauthorized access and/or fire; and room and building energy control such as lighting, heat and air conditioning. As noted above, the telephone instrument may also serve as a small, handy computer which can operate off-line or in direct communication with another computer at another location.

When designing telephone keyset apparatus—that is, a telephone instrument with a number of keys for dialing and for other functional purposes—it is desirable to take into consideration and to provide for the possibility of implementing the various features and functions such as those enumerated above. One of the important requisites for a telephone apparatus of this type is the ability to connect to a standard, four-wire telephone transmission line and to operate with full duplex communication. Another important requisite is that the apparatus transmit and receive information in digital, not analog, form. Digital telephone systems known in the art utilize two different types of solutions to provide duplex communication with sufficient transmission quality. The first technique requires a plurality of transmission lines: that is, separate lines for PCM voice data in each direction, for signalling and for synchronizing. At least two of these wires are also used to provide DC power to the telephone apparatus. The second technique provides a so-called "ping-pong" type of duplex data transmission. With this technique, the transmission of data in opposite directions is alternately generated in the subscriber station/attendant console, one one hand, and in the telephone system or exchange, on the other. This data is transmitted in separate time periods via a two or four-wire transmission line.

Thus, whereas the first technique provides full duplex transmission by utilizing a multiplicity of wires, the second technique uses only a two or four-wire transmission line but sends data alternately back and forth between the telephone exchange and the subscriber station or attendant console.

SUMMARY OF THE INVENTION

It is accordingly an object of the present invention to provide a telephone apparatus which may be implemented with numerous optional features and functions or implemented, as desired, without these features and functions at a cost which is not significantly greater than the present cost of telephone apparatus.

It is a further object of the present invention to provide a telephone apparatus, suitable for use as a subscriber station or attendant console, which is capable of full duplex, digital communication with a standard four-wire telephone transmission line.

It is a further object of the present invention to provide a telephone apparatus which is capable of transmitting PCM encoded voice data on one, but preferably more than one channel simultaneously and/or transmit other digital data in the full duplex mode.

It is a still further object of the present invention to provide a frame format in which to transmit PCM speech data in a telephone transmission system so as to facilitate achieving the objectives recited above.

It is a still further object of the present invention to provide a frame format for transmitting simultaneously at least two channels of PCM speech data and/or other digital data in a telephone transmission system.

These objects, as well as other objects which will become apparent in the discussion that follows, are achieved, according to the present invention, by providing a digital telephone apparatus comprising (1) a serial frame synchronizer, adapted to receive serial digital information that was transmitted over the telephone transmission line and to decode a synchronizing code in the serial digital information, thereby identifying the timing of successive, frames of data; and (2) a sync/signalling generator adapted to pass serial data information to the telephone transmission line for transmission, this serial digital information including a synchronizing code to permit synchronization of the telephone exchange with the telephone apparatus. The serial frame synchronizer also strips off and the sync/signalling generator inserts a signalling code on the serial digital information to permit signalling between the telephone apparatus and the telephone exchange. Finally, the telephone apparatus includes at least one codec/PCM filter which is timed by the serial frame synchronizer and is adapted to transmit and receive serial digital information via the telephone transmission line. The serial frame synchronizer and the sync/signalling generator are both operative to receive and transmit, respectively, a first 8 bit data word comprising the synchronization and signalling information, whereas the codec is operative to receive and transmit a second 8 bit data word comprising a PCM speech sample, immediately following the first data word.

Each frame of data thus includes at least a first data word (byte) and a second data word (byte). One or more additional codec/PCM filters may also be provided in the telephone apparatus to transmit and receive PCM speech samples as additional data words, immediately following the second data word. Since the digital sampling rate in a PCM telephone system is 8 KHz, 8 bit speech samples must be transmitted at a rate of 64 kilobits per second or 1 sample every 125 microseconds. Thus, if two 8 bit data words (that is, first and second data words) are transmitted for every PCM speech sample, the transmission rate will be 128 kilobits per second. For three 8 bit data words per frame, the transmission rate is 192 kilobits/second etc. In this way, the frame format according to the present invention is synchronous with PCM timing; i.e. a multiple of the 8 KHz sampling rate. The frame format also facilitates the transmission of signalling information in a flexible manner; that is, in a byte mode at a faster speed or a bit mode at a slower speed, with a minimum amount of buffering. Finally, this arrangement facilitates the transmission of two or more independent and simultaneous PCM voice and/or digital data channels within one PCM frame and without any buffering.

According to the invention, the serial frame synchronizer generates timing signals to coordinate the transmission and reception of the individual data words in a 125 microsecond frame. In particular, the serial frame synchronizer produces a first enable signal during the transmission and reception of the first data word, a second enable signal during the transmission and reception of the second data word, a third enable signal during the transmission and reception of a third data word, etc.

In a preferred embodiment of the present invention, the synchronization code in the first data word is a prescribed 7 bit code and the signalling code comprises a single bit. More particularly, the bit position reserved for the signalling code comprises, in successive frames, a start code, a signalling code and a stop code. The start code is preferably one bit of one binary value whereas the stop code is a succession of bits of the opposite binary value. If the stop code is 23 consecutive bits and the signalling code is 8 consecutive bits, then the sequence of start code, signalling code and stop code define a superframe which is 32 frames in length.

For a full understanding of the present invention, reference should now be made to the following detailed description of one preferred embodiment of the invention and to the accompanying drawings.

DETAILED DESCRIPTION OF A PREFERRED EMBODIMENT

The invention will now be described with reference to a preferred embodiment of a telephone apparatus suitable for subscriber stations and attendant consoles equipped either with or without one or more optional features such as a speakerphone ("hands free") unit, a digital data interface, a subscriber message detailed recording printer and the like. This digital telephone apparatus is connected for duplex communications with a telephone transmission line that forms a part of a digital telephone system. Such a system may comprise a private branch exchange (PABX) or may constitute a public telephone system.

Figures 1, 1A:
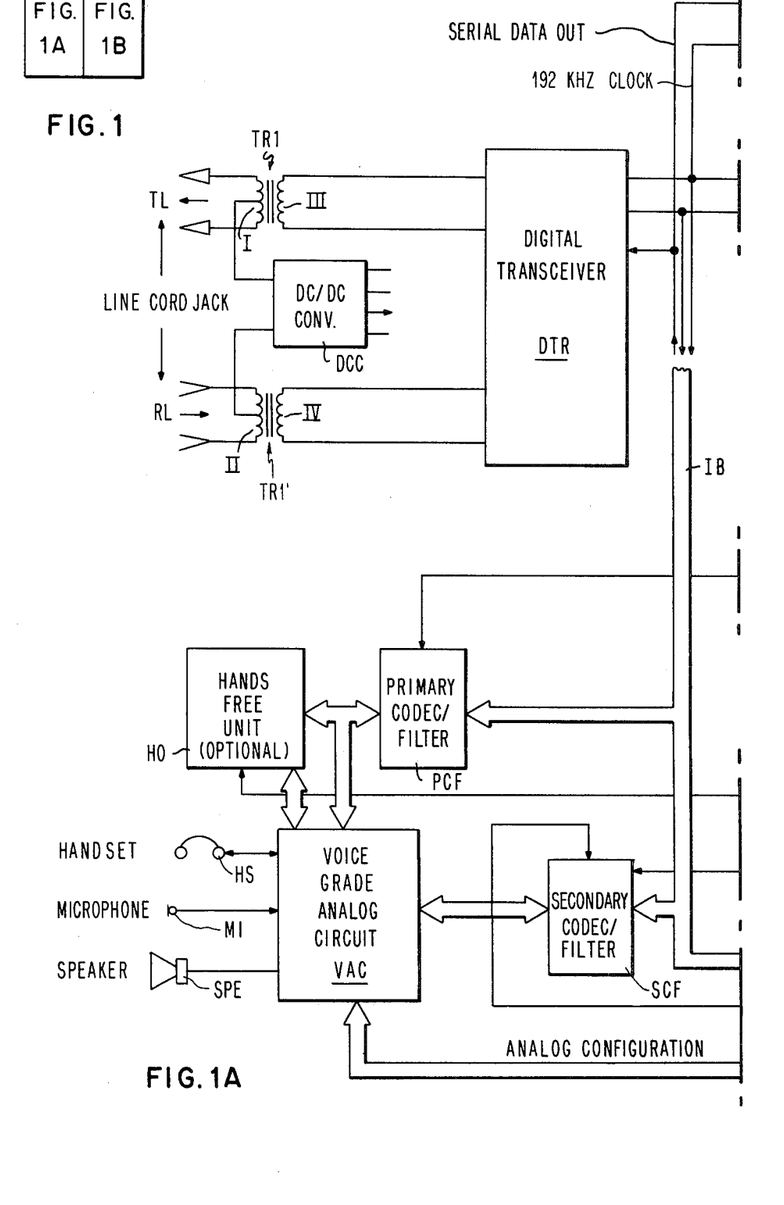
FIGS. 1, 1A and 1B are block diagrams of a digital telephone apparatus according to the invention and suitable for use as subscriber stations and attendant consoles.
Figure 1B:
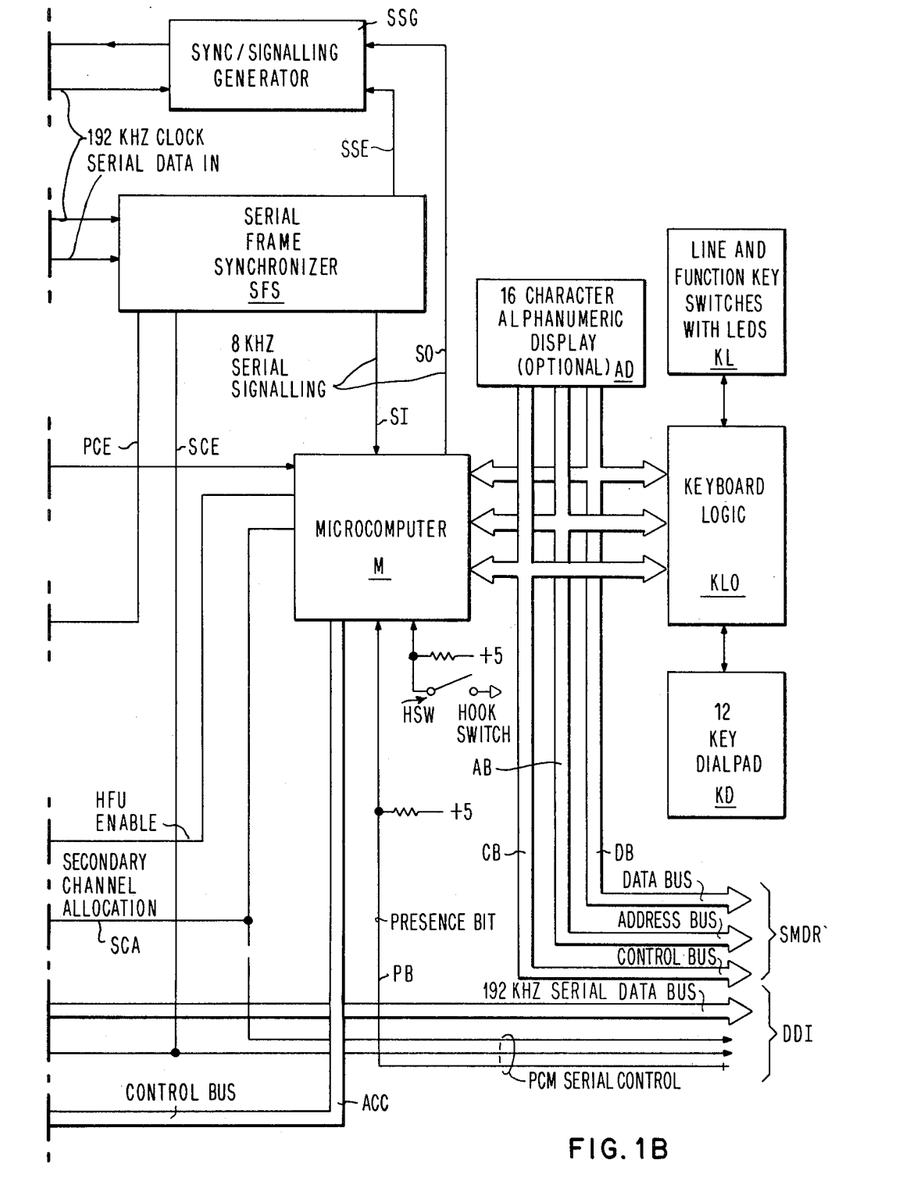

Apparatus Architecture (FIG. 1)

FIG. 1 shows a digital telephone apparatus suitable for subscriber stations and attendant consoles. This apparatus may be connected to peripheral, optional equipment (not shown) such as a digital data interface DDI or a subscriber message detailed recording printer SMDR. The digital telephone apparatus is connected for duplex communications with a telephone transmission line TL/RL. The transmission line TL/RL is connected with windings I and II of transformers TR1 and TR1'. These transformer provides a phantom pair of wires, which is connected with a DC/DC power supply converter DCC. This converter receives direct current from the transmission line and generates the different DC voltages needed for the apparatus.

Secondary windings III and IV of transformer TR1 and TR1' are connected with a digital transmitter/receiver or "transceiver" DTR. The two wire pair TL of the transmission line are the transmitting wires; the two wire pair RL of the transmission line are the receiving wires. The transceiver DTR simultaneously transmits on the line TL and receives from the line RL a plurality of different data words which are arranged in a prescribed three-word frame format, described herein below, and encoded with alternate mark inversion.

The transceiver DTR converts the alternate mark inversion encoded signal received from the transmission line RL into a 192 KHz clock as well as a serial data stream, herein called "serial data in". The transceiver also converts a data stream called "serial data out" from the telephone apparatus into an alternate mark inverted encoded signal for transmission on the line TL.

The 192 KHz clock signal is passed via an internal, serial data bus IB to a sync/signal generator SSG, a serial frame synchronizer SFS, a primary code/PCM filter PCF, a secondary codec/PCM filter SCF and at least one peripheral system, for example, the digital data interface DDI of a digital computer or the like. Serial data received from the transmission line RL is passed via the internal data bus IB to the serial frame synchronizer SFS, the primary codec/PCM filter PCF, the secondary codec/PCM filter SCF and the peripheral system DDI. The digital transceiver DTR receives a serial data stream, for transmission onto the transmission line TL, via the internal data bus IB from the sync/signal generator SSG, the primary codec/PCM filter PCF, the secondary codec/PCM filter SCF and the peripheral system DDI.

The serial frame synchronizer SPS detects from the received serial data the synchronizing code and the signalling bit or bits, which are transmitted in one word of the frame format, so as to synchronize the different time slots of a frame format in time. The serial frame synchronizer generates three enabling signals in synchronism with the three eight-bit words or bytes of each frame format: sync/signalling enable SSE, primary channel enable PCE, and secondary channel enable SCE. The signal SSE is passed to the sync/signalling generator SSG which generates a word (byte) comprising a seven bit synchronization code and a single signalling bit received from the microcomputer M via the signalling output line 50. Upon receipt of the signal SSE, the sync/signalling generator passes this word out on the signal data out line of the internal bus to the digital transceiver DTR.

The signal PCE is passed to the microcomputer M and to the primary codec/PCM filter PCF. The rising edge of the signal PCE informs the microcomputer to look for a signalling bit on the signalling input line SI. The signal PCE also enables the primary codec/PCM filter PCF to receive and transmit on the serial data in and serial data out lines, respectively.

The signal SCE enables the secondary codec/PCM filter SCF and/or the digital data interface DDI for transmission of serial data to and from these units. Selection of one of these units is made by the microcomputer M via a secondary channel allocation signal SCA. The digital data interface requests access to the secondary channel via a pressure bit PB.

Both the microphone and the receiver of the handset as well as the microphone and the loudspeaker of the speakerphone or "hands free unit" are connectable by means of microcomputer—controlled switches with either one (but only one) of the two codec/PCM filters PCF and SCF. These switches belong to the voice grade analog circuit VAC which is controlled by the microcomputer M via an analog configuration control bus ACC. Normally there is no hands free feature in the telephone apparatus because the optional hands free circuit board HO is needed. If added, this hands free circuit board HO is enabled by a signal "HFU enable" from the microcomputer and will only be used in connection with one of the two codec/PCM filters. The hands free circuit selects for transmission the voice of the loudest speaker. It may be a conventional unit and will not be described herein because it forms no part of the present invention.

If one of the codec/PCM filters is connected with the telephone handset for transmitting and receiving of one word of the frame format, thus transmitting and receiving on one channel, a peripheral system, for example the digital data interface DDI, may be enabled to transmit on the other channel. As will be pointed out below, the three-word, two-channel frame format permits the multiplexing of both voice and data, or voice and voice.

In addition to these connections the telephone apparatus may hold a connection with an external subscriber via one codec/PCM filter and, in response to a signal from the subscriber, can make a call back connection via the second codec/PCM filter; that is, via a separate data word or channel of the frame format. In this case the first connection will be disconnected by the voice grade analog circuit VAC and the second connection will be established via the second codec/PCM filter and the voice grade analog circuit.

Thus the two channel frame format permits the telephone apparatus to support two different telecommunication connections simultaneously. For example, one connection may be made with another telephone subscriber for a voice communications while another connection is made with a data system for the transmission of digital data. Alternatively, the telephone apparatus may support a first subscriber to subscriber connection for normal voice communication plus a second subscriber to subscriber connection in a call back function.

As noted above, the microcomputer M controls the switching of the voice grade analog circuit VAC and the hands free circuit HO via the analog configuration control bus ACC and the control line "HFU enable", respectively. Furthermore, the microcomputer M controls the use of the second channel in the PCM frame via the secondary channel allocation line SCA. In this way, a peripheral data system connected to the digital data interface DDI may transmit and receive data via the telephone transmission line TL/RL.

However, the microcomputer has other functions as well. All the data which are transmitted and received over the internal data bus IB are fast data signals: In this embodiment, one word or byte per channel is transmitted every 125 microseconds. As will be explained below, the frame format also supports the transmission of slower data which are needed to perform such functions as setting characters in a numeric display, illuminating LEDs, transmitting operational commands and the like. This slower data is transmitted at a rate of 1 bit per 125 microsecond frame or 8 KHz. This bit, the so-called "signalling" bit, is serially received by the microcomputer M and successive bits are assembled into bytes. For reasons which will be explained below, one byte is assembled every 4 milliseconds for a byte rate of 250 Hz.

Simultaneously with the receipt of signalling bits the microcomputer M transmits signalling bits at the same 8 KHz rate on the output line SO. This enables the microcomputer to conduct a signalling dialog with a private branch exchange (PABX) or some other switch at the end of the telephone transmission line TL/RL.

In addition to the signalling input and output on lines SI and SO, respectively, the microcomputer is coupled to I/O devices such as an alphanumeric display AD, a special message detailed recording printer SMDR and two keyboards KL and KD. The keyboards KL and KD are interfaced to the microcomputer via a keyboard logic KLO. The display, keyboards and printer are connected to the microcomputer via a common data bus DB, address bus AB and control bus CB. These I/O devices are thus addressed and controlled by the microcomputer M and transmit or receive data to and from the microcomputer in the conventional manner. Additional I/O devices may also be connected to the microcomputer via the data, address and control busses.

The alphanumeric display AD may be a 16 character liquid crystal display for informing the operator of the telephone apparatus of telephone numbers, names and other messages. The keyboard KL may comprise line keys for selecting and indicating one of a number of telephone lines to which the telephone apparatus is connected and function keys for selecting and indicating functions such as "HOLD", and "I-USE". The I-USE function is described in the commonly owned U.S. patent application Ser. No. 196,685 filed Oct. 14, 1980 by John Holesha entitled "I-USE Indication in a Telephone Keyset".

The key dialpad KD may or may not be provided with LEDs on each key and is intended for use in dialing telephone numbers. It may also be used to input numerical information to the microcomputer if the latter is programmed for use as a calculator, for example.

In addition to the I/O devices referred to above, the microcomputer M is also connected to the telephone hook switch HSW and is thus informed whether the telephone apparatus is in the "on-hook" or "off-hook" condition.

The microcomputer M may be any commercially available single chip computer which is sufficiently fast and has sufficient ROM and RAM capacity to accomplish the necessary tasks. A suitable microcomputer for this purpose is the Intel 8049.

The software or firmware for the microcomputer M will depend upon the functions the microcomputer is intended to execute. Typical commands for the microcomputer which may be received from a private branch exchange (PABX) via signalling bits on the line SI and assembled into 8-bit signalling bytes are:
1. Ring (or beep) the telephone apparatus;
2. Select type of ring;
3. Flash an LED;
4. Select the LED (to be flashed);
5. Turn on an LED;
6. Select the LED (to be turned on);
7. Turn-off an LED;
8. Select the LED (to be turned off).

Each of the above commands are defined by one byte. Note that two successive bytes are used for a complete instruction.

Typical signalling bytes which are sent from the microcomputer to the telephone system define on-hook and off-hook conditions and indicate the selection of line, function and dial keys by the operator.

Figure 2:
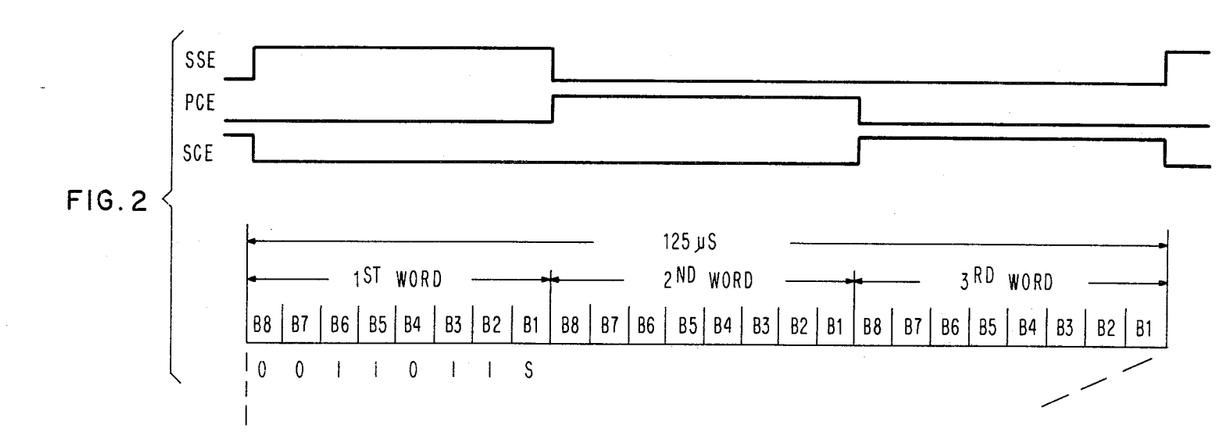
FIG. 2 is a timing diagram of a serial data frame employed in the apparatus of FIG. 1 and comprising three 8 bit words.
Figure 3:
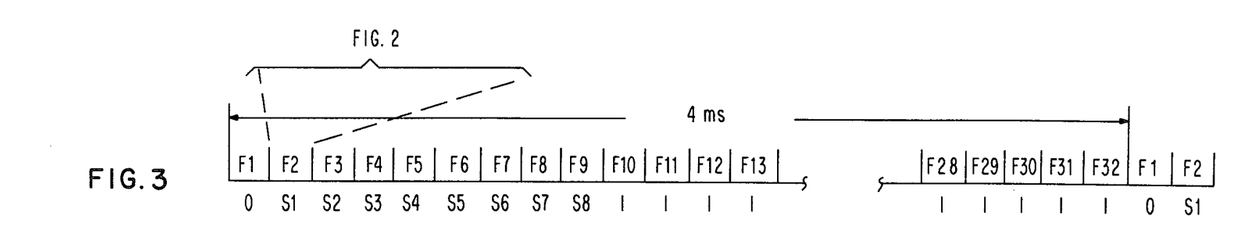
FIG. 3 is a timing diagram of a superframe employed in the apparatus of FIG. 1 and comprising 32 frames as shown in FIG. 2.

Frame format (FIGS. 2, 3)

FIG. 2 shows an example of a frame format which may be used in the telephone apparatus according to the present invention. This example illustrates that, in principle, there exists no limitation on the number of PCM words in a frame. The number of words depends only upon the data rate used in this system. Obviously the data rate in kilobits per second (KB/sec.) must be matched to the needed speed in the telephone system to which the telephone apparatus is connected. In particular, the frame pattern must be synchronous with the PCM frame timing. In the described system, a multiple of the standard 8 KHz sampling rate is used.

Given the 8 KHz sampling rate—that is, one sample every 125 microseconds—the number of words (samples) in each frame and the number of bits per word (sample) determines the frequency of the data pulses. Conventionally, each sample is defined by 8 bits or a byte of information. In the preferred embodiment of the present invention the number of samples per frame is two.

Clearly, there is an upper limit to the frequency with which digital pulses may be transmitted to and from, and processed by the telephone apparatus. In particular, this upper limit is defined by the nature and length of the transmission line and the speed of the individual components of the telephone apparatus such as the transceiver, the synchronizer and, especially, the microcomputer. The telephone apparatus according to the present invention is designed for use with a 4,000 foot cable comprising two conventional twisted pairs of wires.

The standard PCM data rate of 64 KB/sec. (that is, the 8 KHz sampling rate times 8 bits per sample) sets the lower limit on the data rate of the telephone apparatus according to the invention. In addition to the PCM data it is necessary to transmit both synchronization and signalling information. Finally, if permitted by the maximum data rate, it is desirable to transmit at least one additional PCM voice of serial data stream.

According to the present invention, the telephone apparatus simultaneously transmits and receives one "frame" of information every 125 microseconds; that is, the standard PCM sampling rate for telephone systems. Each signal frame is divided into at least two equal, 8-bit time slots: one time slot for the synchronization and signalling information and at least one, but preferably two time slots for separate, independent channels carrying PCM voice data and/or digital data. With three time slots, the data rate is 3×64 KB/sec. or 192 KB/sec.

FIG. 2 shows the 125 microsecond frame divided into the three time slots. The three enable signals—sync/signalling enable SSE, primary channel enable PCE, and secondary channel enable SCE—are also shown to indicate their time relationship with the first, second and third words of the frame respectively.

The first seven bits (B8-B2) of the first word are set at the synchronizing code, which is preferably, alternately 0011011 and its inverse 1100100. The 8th bit (B1) in the first word, designated "S", is successively a start bit, one of 8 signalling bits and one of 23 stop bits.

The second word of the frame contains a single PCM speech sample of 8 bits (1 byte). The third word may contain either a PCM speech sample or a digital data word of 8 bits (1 byte). These second and third words are transmitted via the internal data bus IB of the telephone apparatus between the transceiver DTR and the primary codec/PCM filter (for the second word) and the secondary codec PCM filter or the DDI (for the third word).

It will be understood that the frame format may comprise only the first two words, or it may comprise more than three words, thus correspondingly increasing the number of transmission channels. If only two words are provided, the data rate will be 2×64 KB/sec. or 128 KB/sec. If more than three words are provided, the data rate must be correspondingly increased to permit transmission on each channel at the 64 KB/sec. rate.

FIG. 3 shows a "superframe" of 32 frames, each identical to the frame shown in FIG. 2. Each superframe has a transmission time of 4 milliseconds.

The first frame F1 of the superframe contains a start bit or "0" in the B1 bit position of the first word. The next 8 frames contain the signalling bits S1, S2 ... S8 in this bit position. The following 23 frames contain stop bits, or a "1", in the B1 bit position. With this arrangement, one signalling byte is transmitted to and from the microcomputer every four milliseconds. During the time that the frames F10–F32 are transmitted and received, the microcomputer has time to control other functions of the telephone apparatus.

As will be appreciated from the discussion above, the frame format according to the invention facilitates the transmission of two or more independent and simultaneous voice and/or data channels within one PCM frame and without any buffering. Consequently this format makes possible the provision of additional features, such as additional connections to peripheral units, without any change in the existing telecommunication system.

The frame format according to the invention also permits the extraction of a clock signal from the data information with no phase jitter thus allowing coherent operation between facilities.

Finally, the frame format provides optimized bandwidth for digital data transmission and alleviates out-of-band radio interference.

Figure 4:
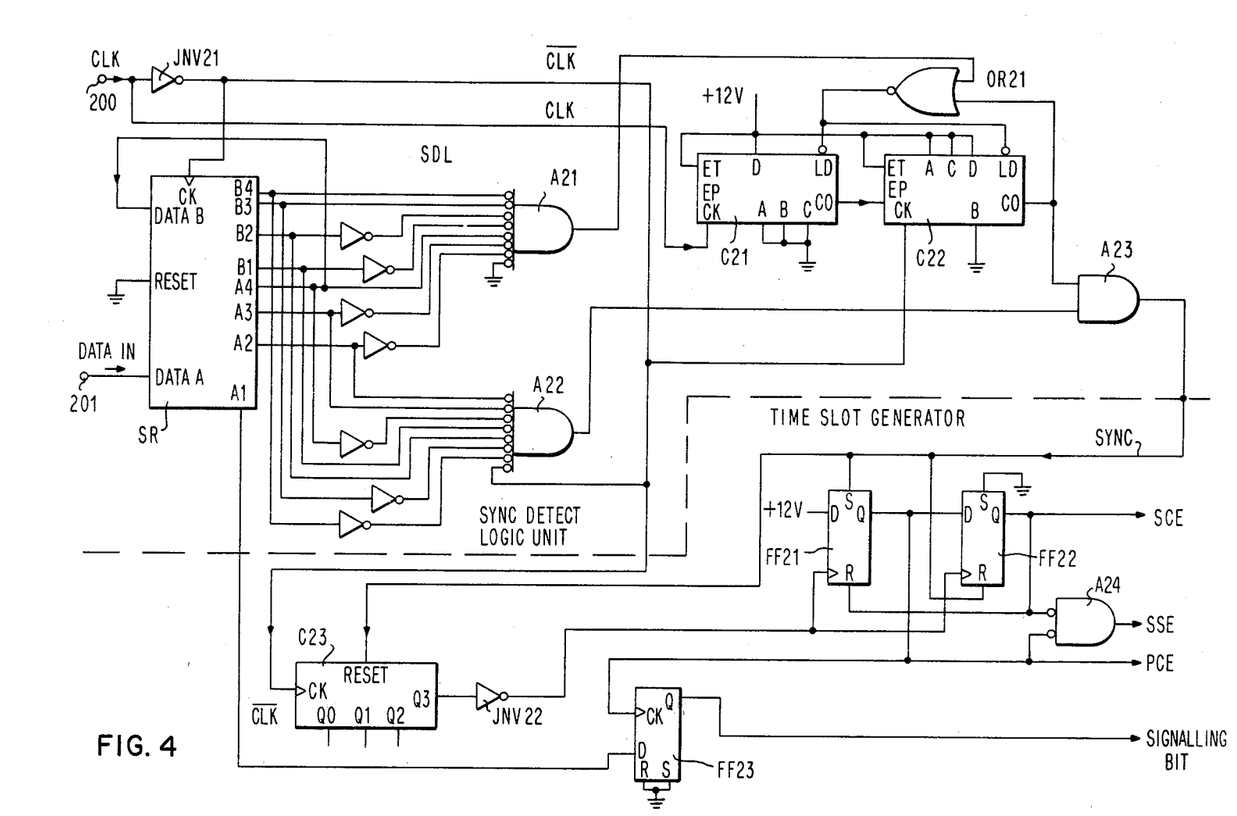
FIG. 4 is a schematic diagram of the serial frame synchronizer shown in FIG. 1.
Figure 5:
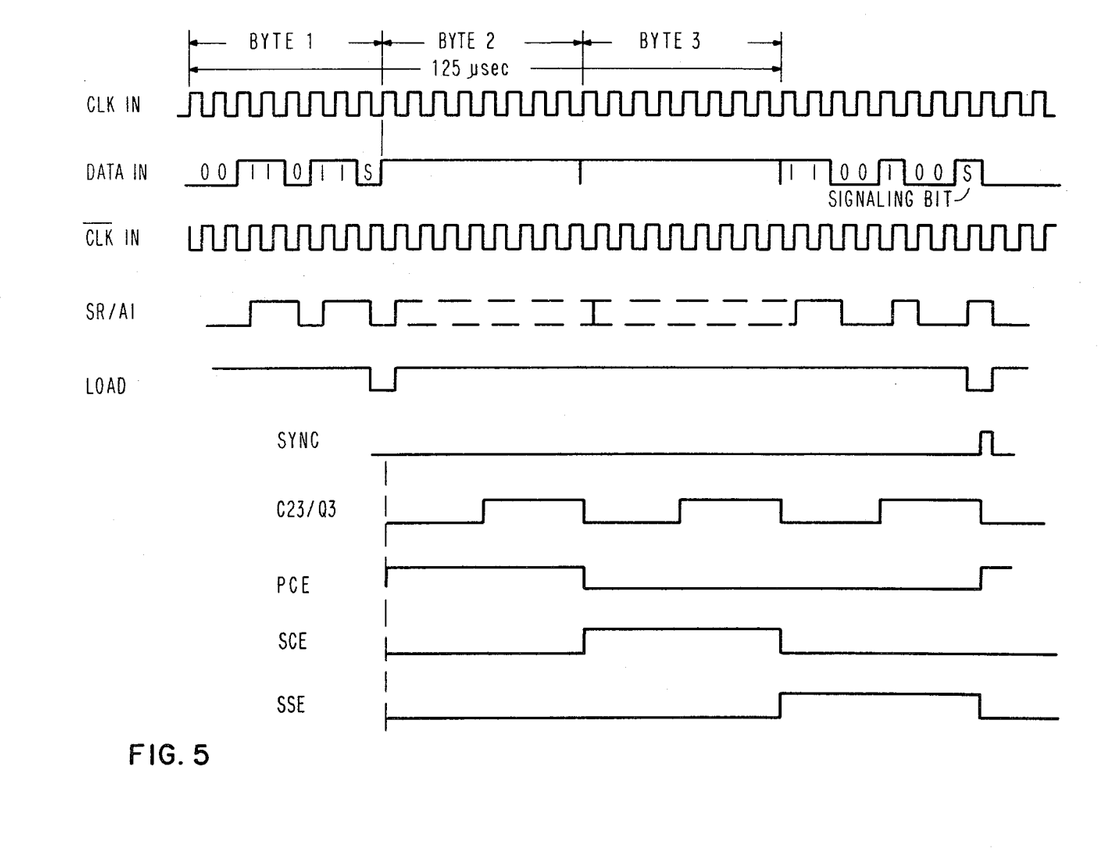
FIG. 5 is a timing diagram of a number of signals appearing in the serial frame synchronizer shown in FIG. 4.

Serial Frame Synchronizer SFS (FIGS. 4, 5)

It has been pointed out that the serial data rate, employed in the digital telephone apparatus according to the present invention, is 192 Kbit/sec. With reference to FIGS. 2 and 3, it has been described that each serial data frame format includes three bytes, each comprising eight bits. In each frame format one of these bytes has the characteristic of the synchronizing/signalling byte command of seven synchronizing bits and a signalling bit.

By means of the synchronizing bits, the frame formats of a continuous serial data stream can be detected by the serial frame synchronizer SFS. By evaluating the time of the occurrence of the synchronizing bits within the serial data stream the three bytes of a frame format which are generated and transmitted independently of each other are identified. For this reason the seven bit code which consists of the synchronizing bits has to have very low correlation with any encoded data information neither normal data information nor an idle channel code. Statistical studies have proved that the bit series of 0011011 does follow these requirements. Accordingly, the inverted synchronizing bit code comprises of the series 1100100.

The serial frame synchronizer is mainly composed of three sub-units, a serial-to-parallel converter for converting the information received at the serial data stream into a parallel 8-bit format, a logic unit for continuously evaluating the current state of the serial-to-parallel converter and a time slot generator for producing under control of a synchronizing pulse three output signals each occurring concurrently with a respective one of the three bytes of a frame.

In accordance with the block diagram of FIG. 1, the serial frame synchronizer SFS receives a 192 KHz clock at a clock input 200 and serial data at a data input 201. Forming the serial-to-parallel converter in the serial frame synchronizer SFS there is arranged a shift register SR. The shift register SR is implemented as a double four-bit shift register with two corresponding serial data inputs DATA A and DATA B, respectively and two sets of four parallel outputs A1 through A4 and B1 through B4. These two four-bit shift registers are cascaded by short-circuiting the most significant output A4 of the first stage with the second serial data input DATA B. The first serial data input DATA A is connected to the data input 201 of the serial frame synchronizer SFS. The operation of the shift register SR is controlled by clock signals CLK which are inverted by an inverter I21 with respect to the clock signal pulse train CLK supplied to the clock pulse input 200. For detecting the seven synchronizing bits of a frame format there is arranged the synchronizing detect logic unit at the output of the shift register SR. It comprises a straight-forward logical network composed of a series of inverters and two AND-gates A21 and A22. Each of the inverted inputs of the AND-gates is coupled to a respective one of the most significant parallel outputs A2 through A4 and B1 through B4 of the shift register SR either directly or by one of the inverters. The AND-gates A21 and A22 thus are all zero detectors and are alternatively supposed to be operative if the current state of the shift register SR reflects either the normal or the inverted synchronizing bit pattern.

It has been described hereinbefore that consecutive frames have the characteristic that alternatively a normal and the inverted synchronizing bit pattern occurs. For fail-safe operation, it is now evaluated that for two consecutive frames both the normal and the inverted synchronizing bit pattern occur within a given distance determined by the data frame format. This is achieved by counting the clock pulses occurring after having detected one of the synchronizing bit patterns and by evaluating the status of the shift register SR one pulse frame later if then the inverse synchronizing bit pattern is present.

To perform this operation there is arranged at 24-bit counter in accordance with the chosen frame format which is implemented by means of two cascaded 16-bit counters C21 and C22. The first counter C21 is controlled by the 192 KHz clock signal CLK received at the clock pulse input 200 of the serial frame synchronizer SFS. It produces a carry output signal at its carry output CO when the maximum count is reached. This output signal is fed as a count-enable signal to a count enable input EP of the second counter C22 which is controlled by the inverted clock pulses CLK. Both counters are preset in common to a predetermined starting count by a preset signal applied in parallel to their load inputs LD. This preset signal is generated at the output of an OR-gate OR21 having two inputs each connected to a respective one of the outputs of the first AND-gate A21 and the carry output CO of the second counter C22. Thus, an output signal at the carry output CO of the second counter C22 occurs whenever 24 bits of the 192 KHz clock pulse train have passed. In other words, the signal condition of the first AND-gate A21 detecting a synchronizing bit pattern is buffered for exactly one pulse frame and is then appearing at the carry output CO of the second counter C22.

At this time, the second AND-gate A22 of the synchronizing detector logic unit is supposed to carry a signal of signal level "1", if the bit pattern occurring one pulse frame earlier in fact was a synchronizing bit pattern. The signals occurring at the carry output CO of the second counter C22 and the second AND-gate A22 are logically linked by a further AND-gate A23 which produces an output signal of signal level "1" occurring exactly once after each series of 48 pulses of the 192 KHz clock pulse train CLK. This output signal of the AND-gate A23 is the synchronizing signal SYNC locking the serial data stream to the correct frame format.

The described circuit is implemented with a minimum of hardware and has a very high noise immunity. Once both synchronizing bits in form of the output signals of the AND-gates A21 and A22 are detected, the circuit remains locked with these synchronizing bits. The only time that the circuit may lose synchronization is when the synchronizing signal is slipped. But any noise associated with the synchronizing bits will not cause the circuit to loose synchronization once the synchronized status is detected.

The synchronizing signal SYNC controls the time slot generator for locating the three different bytes in a frame by means of the three timing signals "Synchronizing/Signalling Enable" SSE, "Primary Channel Enable" PCE, and "Secondary Channel Enable" SCE. Each of these signals occurs one after the other and specifies during its signal level "1" a time period for the occurrence of a respective one of the three bytes of a frame.

For obtaining this operation the time slot generator is provided with a further 8-bit counter C23 which receives the inverted clock pulses CLK at its clock input. The counter is designed as a divide-by-eight counter and produces at its Q3 output a 24 KHz pulse train which is inverted by a further inverter I22 and, in common, applied to clock inputs of two further D flip-flops FF21 and FF22. A Q-output of the first flip-flop FF21 of the time slot generator is connected to the D-input of the second flip-flop FF22. The Q-output of the second flip-flop FF22 is connected to the reset input of the first flip-flop FF21 of the time slot generator. Thus, resetting of the first flip-flop FF21 is accomplished whenever the second flip-flop FF22 is set.

As will be explained in the following the first flip-flop FF21 in its set condition generates the primary channel enable signal PCE whereas the second flip-flop FF22 in its set condition carries the secondary channel enable signal at its Q-output. Both signals are applied to a respective one of the inverted inputs of a further AND-gate A24 which is operative if both the primary channel enable signal PCE and the secondary channel enable signal SCE are at signal level "0". Thus, the output signal of this further AND-gate A24 generates the sync-/signalling enable signal SSE.

In the time slot generator there is provided a further D flip-flop FF23 having a data input D connected to the least significant output A1 of the shift register SR and a clock input which is connected to the Q-output of the first flip-flop FF21 of the time slot generator. The D flip-flop FF23 operates as a synchronizer for detecting the signalling bit which is present at the least significant output of the shift register at a time concurrently with the rising edge of the primary channel enable signal PCE.

The operation of the serial frame synchronizer which implementation has been described hereinbefore will now be pointed out with reference to various timing signals shown in FIG. 5. The first line represents the 192 KHz clock pulse train CLK as applied at the clock input 200 to the serial frame synchronizer SFS. The stream of serially incoming data which is received at the data input 201 of the serial frame synchronizer is shown in the second line of FIG. 5. In the left hand and the right hand margin of this pulse train is assumed that two consecutive patterns of synchronizing bits appear. Derived from this signal condition, the alignment of the frames is indicated on top of FIG. 5. The third line of FIG. 5 shows the wave form of the clock pulse train in inverted form which is referenced as CLK.

These three pulse trains form the input signals of the serial frame synchronizer SFS from which signals all the remaining wave forms shown in FIG. 5 are derived. The fourth line of FIG. 5 represents the operation of the shift register SR by means of the output signal occurring at the least significant output A1 of the shift register SR. As to be seen from comparison with the data stream shown in line 2, the output pulses have a delay of half the bit time which is resulting from controlling the shift register SR by the inverted clock pulses CLK. In the fourth line there is shown the timing of the load pulses applied to the counters C21 and C22 which pulses are produced at the output of the OR-gate OR21. These signals occur if the signal pattern at the most significant outputs A2 through A4 and B1 through B4 of the shift register SR reflects the synchronizing bit pattern. The signals also can be determined by the carry output signal of the second counter C22 of the serial frame synchronizer. These signals occur in a synchronized mode of operation every 24 bits of the inverted clock pulse train CLK.

The sixth line shows the timing of the synchronizing bit SYNC which is identical with the output signal of the AND-gate A23. This signal is applied to both a reset input of the third counter C23 and the set input of the first D flip-flop FF21 of the time slot generator. Thus, the third counter C23 is reset to zero and will carry an output signal at its Q3-output eight clock pulses later. At the same time the first D flip-flop FF21 is set thereby generating at its Q-output the primary channel enable signal PCE. The next "1" to "0" transition of the output signal of the third counter C23 enables the second flip-flop FF22 of the time slot generator to load the data information applied to its data input D. The second flip-flop in its set condition generates the secondary channel enable signal SCE and a reset signal for the first flip-flop FF21. Thereby it is accomplished that the next following transition from "1" to "0" level of the output signal of the third counter C23 cannot reactivate the first flip-flop FF21 which status, therefore, remains unchanged for two consecutive clock pulses.

The same clock pulse however which is blocked at the first flip-flop FF21 drives the second flip-flop FF22 into its reset state. Thereby, the secondary channel enable signal is turned off and furthermore the first flip-flop FF21 of the time slot generator becomes unlocked and can be set again by means of the following clock pulse. Since both flip-flops FF21 and FF22 are thus reset for a period of eight 192-KHz-clock pulses between the trailing edge of the secondary channel enable signal SCE and the rising edge of the primary channel enable signal PCE, the sync/signalling enable signal SSE will be generated at the output of the AND-gate A24. The timing of the three enable signals PCE, SCE and SSE may be obtained from lines 8–10 of FIG. 5.

Figure 6:
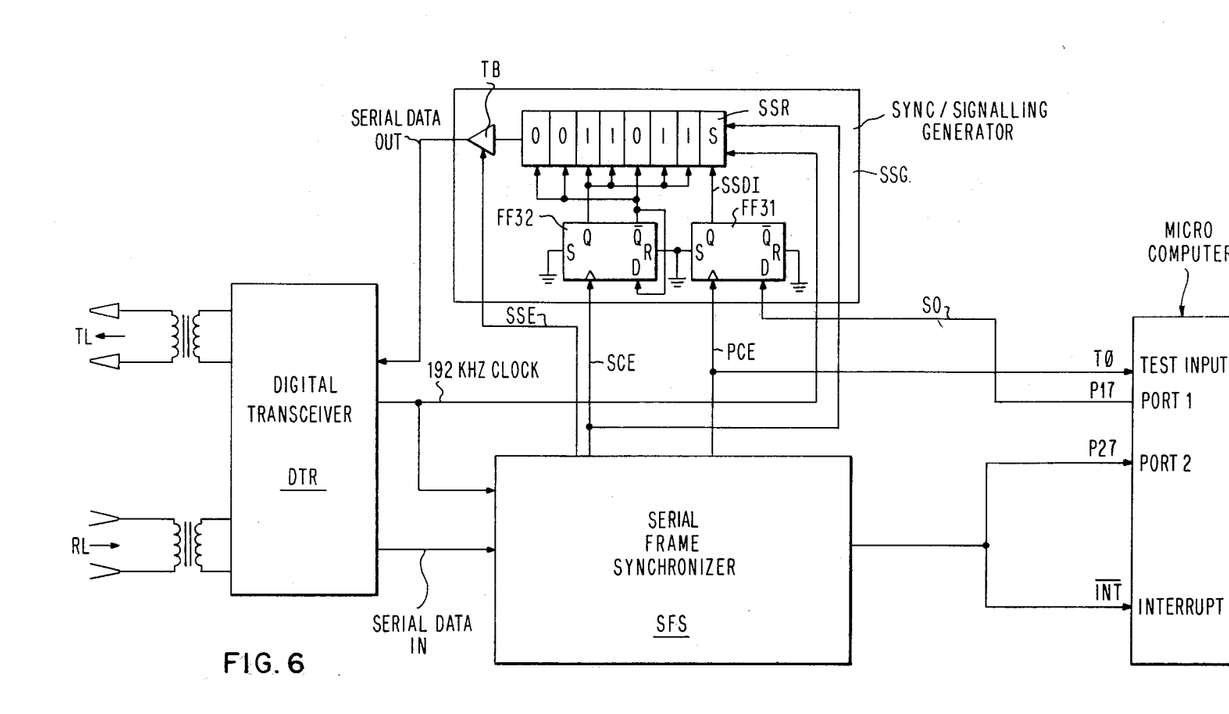
FIG. 6 is a schematic diagram of the sync/signalling generator shown in FIG. 1.
Figure 7:
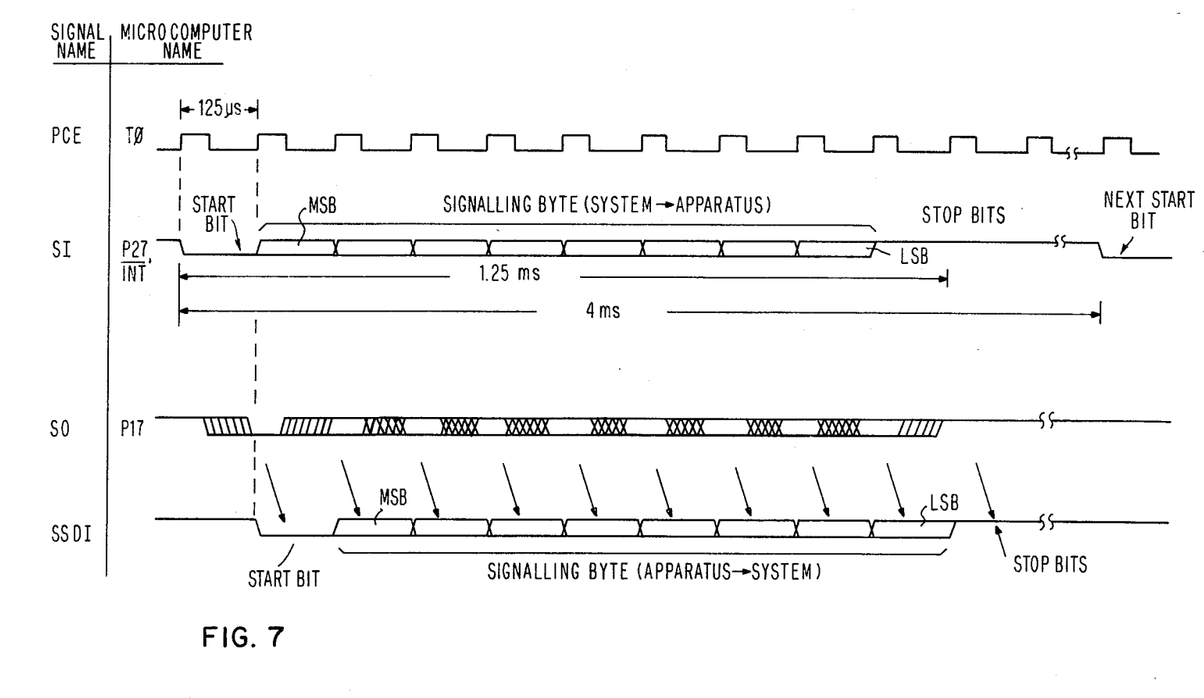
FIG. 7 is a timing diagram of a number of signals appearing in the sync/signalling generator of FIG. 6.

Sync/Signalling Generator (FIGS. 6 and 7)

The internal structure of the sync/signalling generator SSG, as well as its interrelationship with the digital transceiver DTR, serial frame synchronizer SFS and the microcomputer M is shown in FIG. 6. As noted above, the digital transceiver passes digital data in the prescribed frame format to the serial frame synchronizer SFS via the "serial data in" line of the internal data bus. The digital transceiver also receives digital data in this frame format via the "serial data out" line of the internal data bus for transmission on the telephone line TL. Finally, the digital transceiver generates a 192 KHz clock signal from the signals received from the transmission line RL. The 192 KHz clock is passed to both the sync/signalling generator SSG and the serial frame synchronizer SFS, as well as to other components of the digital telephone apparatus (not shown in FIG. 6).

The serial frame synchronizer SFS passes one bit of each 125 microsecond frame to both the P27 input port and the INT interrupt input of the microcomputer M. This bit appears in the B1 bit position of the first data word in the frame and may be a start bit, a signalling bit or a stop bit.

As explained previously, the serial frame synchronizer produces three enable signals: sync/signalling enable SSE, primary channel enable PCE and secondary channel enable SCE. These three signals are passed to the sync/signalling generator SSG. The signal PCE is also passed to the T0 or "test input" port of the microcomputer M.

The microcomputer successively generates start, signalling and stop bits and passes these to the sync/signalling generator via its output port P17 and the line S0. These bits are successively latched into a flip-flop FF31 for subsequent insertion in the B1 bit position of a shift register SR via an input line SSDI. The synchronization code 0011011, and its inverse 1100100 are inserted in the SSE shift register SSR from the two outputs of a second flip-flop FF32. This second flip-flop is clocked once per frame by the secondary channel enable signal SCE. This flip-flip is configured to divide the SCE pulses by two so that it toggles state upon receipt of each SCE pulse.

The shift register SSR also receives the secondary channel enable signal SCE. When this enable signal is present, the shift register may be loaded, and it will hold its contents without shifting. Upon termination of the SCE signal the shift register will shift its contents out at the 192 KHz clock rate via a tri-state buffer TB. This buffer is enabled by the sync/signalling enable signal SSE to pass the contents of the shift register SR to the "serial data out" line of the internal data bus. The tri-state buffer isolates the shift register from the "serial data out" line during the periods that the second data word and third data word of a frame are transmitted.

FIG. 7 shows the timing of the signals appearing on the lines in FIG. 6 for the period of 1 superframe (4 milliseconds). As is shown, the microcomputer M receives a start bit at its inputs P27 and INT coincident with the leading edge of the primary channel enable signal PCE. Similarly, a start bit appears at the output of the flip-flop FF31 on line SSDI upon appearance of the leading edge of the next subsequent pulse of the signal PCE. Thus, all the start, signalling and stop bits are received one 125 microsecond frame earlier by the microcomputer M than the bits passed to the shift register via the first flip-flop FF31, due to the signal frame delay introduced by this flip-flop. The use of the flip-flop FF31 to store one bit for one frame period is necessary because the microcomputer is timed by the receipt of a bit and only thereafter does it send a bit out from its output port P17.

The microcomputer M initially establishes synchronism with the superframe by monitoring the bits appearing at its input P27 for 23 stop bits and a subsequent start bit. Once synchronism is established, the microcomputer disables its interrupt INT after receiving 8 successive signalling bits until shortly before it excpects to receive the next start bit. In this way, the microcomputer will not be interrupted by a stop bit which is erroneously a "0" when it should be "1", so that it will continue to attend to its other functions as the stop bits are received. The microcomputer operates asynchronously from its own high frequency clock. Microcomputer software or firmware is used to determine the expected times of arrival of the pulses on line SI.

Since there is no handshake or echo operation in the communication between the telephone apparatus according to the invention and the telephone system to which it is connected, there is a need for redundancy in the signalling information transmitted to avoid problems upon receipt of an incorrect signalling bit. An incorrect signalling bit can cause the telephone apparatus to function improperly not only during calls but also between calls, since the apparatus is continually "on" as long as it is connected.

Assuming a typical bit error rate of $1 \times 10^{-7}$ (1 incorrect bit out of every 10 million) a bit error would occur every:

$$\frac{10^7 \text{ bits}}{1 \text{ error}} \times \frac{1 \text{ Sec}}{192 \times 10^3 \text{ bits}} = 52.083 \text{ secs/error}$$

Assuming an equal probability of any of the three words comprising the 24 bit frame of being the word with the bit error, a bit error in the sync/signalling word (first word) would occur every:

$$\frac{52.083 \text{ secs}}{\text{bit error}} \times \frac{3 \text{ bytes}}{\text{frame}} = 156.25 \text{ secs/error}$$

According to the invention, this bit error rate has been increased to an order of magnitude of years per error by sending each signalling word (byte) to the microcomputer 3 successive times. The microcomputer compares the three bytes, bit by bit, and responds to the signalling command only if at least two of the three bytes are equal. Thus, the microcomputer responds to the majority vote of the signalling bytes.

General

As described above the digital telephone apparatus according to the invention is connected for duplex communication with the telephone speech transmission line TL/RL. This apparatus includes the digital transmitter/receiver or transceiver DTR, which is connected with the transmission line TL/RL for transmitting and receiving digital speech data, signalling data and other information via the transmission line TL/RL and also via the internal data bus IB. The serial frame synchronizer SFS detects the synchronization bits and controls the exact timing of the time slots of the data channels in each frame format as well for incoming as for outgoing speech and data transmission.

This configuration of the digital telephone apparatus permits the simple adaption and connection to the normal four wires used in telephone lines. Thus, in a very simple and effective manner it becomes possible to receive and transmit synchronized PCM data, which includes speech data as well as other data and signals.

Because either the primary codec/PCM filter PCF or at least one secondary codec/PCM filter SCF is connected with the internal data bus IB and, via switching means of the voice grade analog circuit VAC, with the microphones, the receiver and the loudspeaker of the subscriber/attendant set, thus utilizing only one channel for PCM voice transmission, at least one more channel is available for the simultaneous transmission of a further data word in the PCM frame format. It is therefore possible to receive and to transmit, completely independently of each other, two different kinds of data. Consequently, the internal data bus IB may be connected with additional peripheral equipment for additional features.

If the internal data bus IB is connected with a peripheral data system, the subscriber who is using the telephone apparatus according to the invention may simultaneously transmit and receive the speech data as well as all types of other data, for example from an external computer.

The transceiver DTR generates pulses in a needed timing scheme with the required broadness, and the serial frame synchronizer places the data bytes in the correct time slots of the frame format. This format contains at least a first plurality of synchronization bits with at least one added signal information bit as a first word and at least a second plurality of speech information bits and/or data information bits as a second word. Each word has one byte of information. In this way the transmission of synchronizing bits, signalling bits, speech and other data bits is PCM compatible and is organized in a simple easily-processed manner.

In small systems, without connected peripheral equipment, a frame may be formed in a very simple, inexpensive manner by two bytes. In larger systems the second byte in a frame represents a speech word whereas the third byte may represent another speech word or a data word. In this way, the telephone apparatus may serve as a telecommunications device for certain peripheral equipment such as a data system connected to the apparatus via a digital interface DDI. Accordingly, the frame format makes it possible to transmit simultaneously different data on separate channels of the same frame.

Line and function keys KL, dial keys KD, an alphanumeric display AD and a subscriber message detailed recording printer SMDR are all connectable, directly or indirectly via logic means KLO, with the microcomputer M of the telephone apparatus according to the invention to provide convenient human-interactive input and output. These I/O devices are operated at a much slower speed than the data system mentioned just above.

Furthermore, in the digital telephone apparatus the voice grade analog circuit switching means VAC controlled by the microcomputer M enables an optional transmission of speech data via one of the two codec/PCM filters in one of the corresponding frame words or channels. This arrangement makes it possible not only to transmit data from a data system simultaneously with PCM voice, but also, for example, to establish a call back connection with a remote subscriber or establish an "intercom" connection with a second subscriber independently of the original call. To this end, optional calling and called subscriber signals evaluated by the microcomputer M produce switching commands which control the voice grade analog circuit switching means VAC to interconnect different optional peripheral units with the telephone apparatus. Therefore, the optional use of one and/or both codec/PCM filters, PCF or SCF, makes it possible to use more than one transmission channel in a simple way both separately as well as simultaneously.

The number of frame words fixes the possible number peripheral units which may be simultaneously connected with the digital telephone transmission line. In other words, the number of 8-bit words in a frame determines the number of features which may be added to the telephone apparatus. If three or more words are provided, for example, thereby providing two or more transmission channels, it is possible to simultaneously and independently connect two or more voice grade analog circuits VAC, at least one data system DDI as well as video terminals and/or printers, etc. with the four wire transmission line TL/RL.

There has thus been shown and described a novel digital telephone apparatus which fulfills all the objects and advantages sought therefore. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. Digital telephone apparatus for transmitting and receiving PCM speech data as well as signalling information via a telephone transmission line, said apparatus comprising, in combination:
   (a) a serial frame synchronizer, adapted to receive serial digital information that was transmitted over said transmission line, said serial frame synchronizer decoding a synchronizing code in said serial digital information and thereby identifying the timing of successive, 125 microsecond frames of data;
   (b) a sync/signalling generator connected to said serial frame synchronizer and adapted to transmit serial digital information over said transmission line, said sync/signalling generator being responsive to a first enable signal received from said serial frame synchronizer for shifting out to said transmission line a first outgoing 8 bit data word comprising a synchronization code and a signalling code;
   (c) a first codec/PCM filter connected to said serial frame synchronizer and adapted to transmit serial digital information over said transmission line, said first codec/PCM filter being responsive to a second enable signal from said serial frame synchronizer for shifting out to said transmission line a second outgoing 8 bit data word comprising a PCM speech sample, said second outgoing 8 bit word immediately following said first outgoing 8 bit data word; and, (d) means for generating a third outgoing 8 bit data word connected to said serial frame synchronizer and adapted to transmit serial digital information over said transmission line, said means for generating said third outgoing 8 bit data word being responsive to a third enable signal from said serial frame synchronizer for shifting out to said transmission line said third outgoing 8 bit data word, said third outgoing 8 bit data word immediately following said second outgoing 8 bit data word.

2. The digital telephone apparatus recited in claim 1, wherein said first codec/PCM filter is also adapted to receive serial digital information that was transmitted over the transmission line, said first codec/PCM filter being responsive to said second enable signal from said serial frame synchronizer to receive a second incoming 8 bit data word comprising a PCM speech sample simultaneously with the transmission of said second outgoing 8 bit data word, whereby said first codec/PCM filter operates in a full duplex mode.

3. The digital telephone apparatus recited in claim 1, wherein said means for generating a third outgoing 8 bit data word comprises a second codec/PCM filter, said first and said second codec/PCM filters each being connected to a separate analog speech signal source.

4. The digital telephone apparatus recited in claim 1, wherein said means for generating a third outgoing 8 bit data word comprises means for receiving digital data from a digital data signal source.

5. The digital telephone apparatus recited in claim 3, wherein said second codec/PCM filter is also adapted to receive serial digital information that was transmitted over the transmission line, said second codec/PCM filter being responsive to said third enable signal from said serial frame synchronizer to receive a third incoming 8 bit data word comprising a PCM speech sample simultaneously with the transmission of said third incoming 8 bit data word, whereby said second codec/PCM filter operates in a full duplex mode.

* * * * *